UNITED STATES PATENT OFFICE.

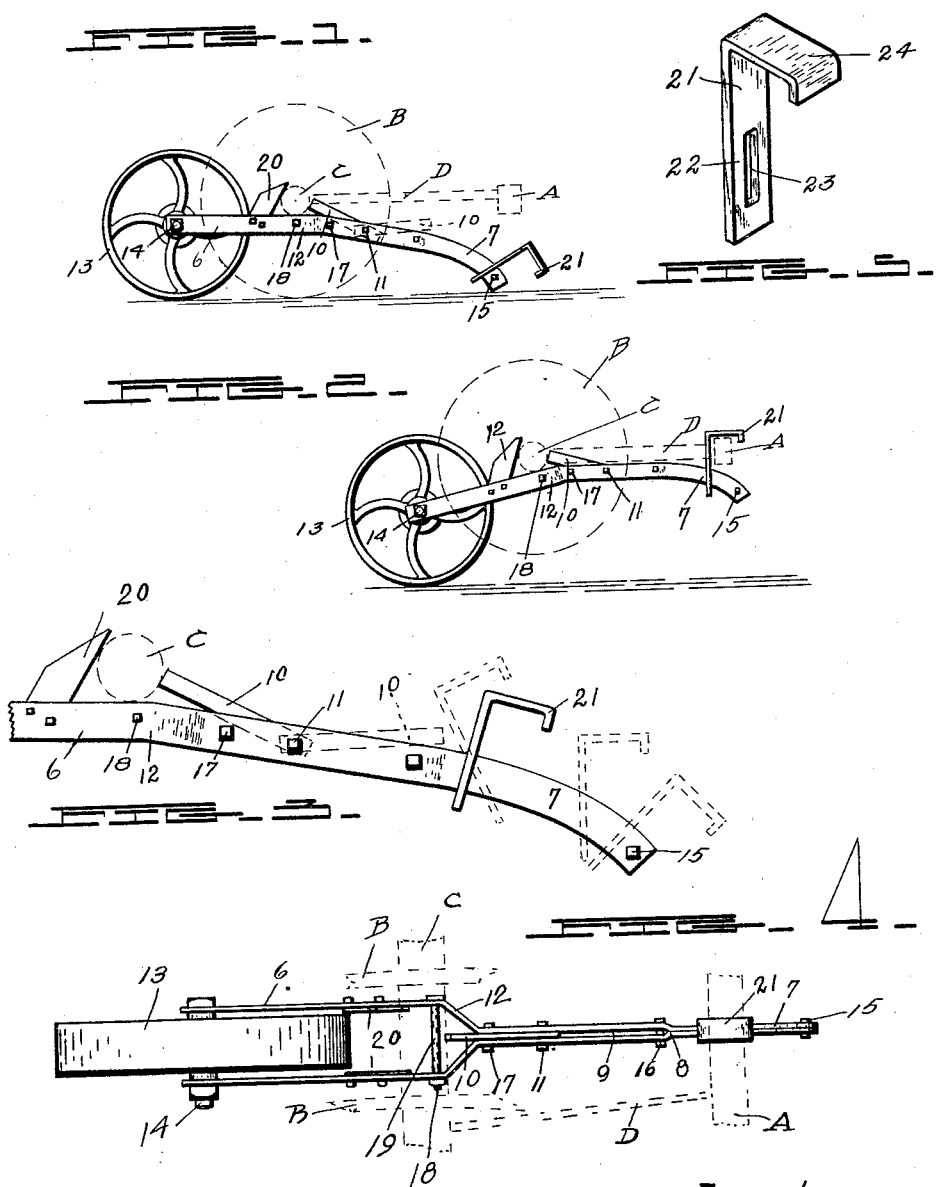

SAMUEL B. HAZARD, OF PEORIA, ILLINOIS; LEE W. HAZARD, ADMINISTRATOR OF SAID SAMUEL B. HAZARD, DECEASED, ASSIGNOR TO R. C. SCHOFIELD, OF FREEPORT, ILLINOIS.

TRANSPORT-TRUCK.

1,120,938.

Specification of Letters Patent.

Patented Dec. 15, 1914.

Application filed February 3, 1911. Serial No. 606,329.

*To all whom it may concern:*

Be it known that I, SAMUEL B. HAZARD, a citizen of the United States, residing at Peoria, in the county of Peoria and State of Illinois, have invented certain new and useful Improvements in Transport-Trucks, of which the following is a specification.

This invention has reference to trucks and relates particularly to a transport truck for disk-harrows.

One of the objects of the present invention is to provide a transport truck which will fit any make of disk-harrow.

The invention has for a further object to provide a transport truck for disk-harrows where the wheel of the truck is not passed under the disk axle, or bearing, consequently a much larger wheel may be used on the truck, which runs much easier than a small wheel.

In the drawings,—Figure 1 is a side elevation showing the manner of inserting the truck into position to elevate the disks from the ground; the disks and disk frame shown in dotted lines; Fig. 2 is a view similar to Fig. 1, except that the truck is shown in the position it would be in when ready to transport the disk-harrow; Fig. 3 is an enlarged side elevation of the transport truck frame, showing the adjustability of parts thereof; Fig. 4 is an enlarged plan view of the truck, and part of a disk-harrow in dotted lines, and Fig. 5 is a perspective view of a hook for attaching the forward end of the truck frame to the harrow-frame.

Like characters of reference denote corresponding parts throughout the figures.

To illustrate the adaptability of my truck to disk-harrows, I have shown parts of a disk-harrow, in dotted lines, in Figs. 1, 2 and 4, wherein the front frame of the harrow is designated A, the disks B, the disk-axle or bearings C and the connecting frame or straps D.

The transport truck consists essentially of the frame parts 6, which, at their forward ends, as at 7, are placed in juxtaposition to each other and secured together to form, what will be known as the "handle portion". At 8 the parts 6 diverge and for a portion of their length are spaced a very short distance apart leaving an opening 9, and in such opening is pivoted a block or short bar 10, at 11. At 12 the parts 6 again diverge, but for a much greater distance than at 8, providing space between the parts for carrying the truck-wheel 13, which is journaled on an axle or spindle 14, at the extreme rear ends of the parts 6.

From the point 12 on the bars to their rear ends, the bars are approximately straight, that is, horizontal and from the point 12 to their front ends they are inclined downwardly, the handle portion 7 being slightly curved. With this construction, the frame may be easily inserted between the proper disks and forwardly of the disk-harrow and to connect the frame of the truck to the frame of the harrow it is necessary to elevate the handle portion 7 which will cause the frame to engage and elevate the axle or bearing of the disks and raise the disks off of the ground, see Figs. 1 and 2, wherein the disks are shown supported and movable on the truck-wheel 13.

The parts 6 are united at 15, 16, 17 and 18 by bolts or other suitable means, the bolt 18 passing through a sleeve 19 which holds the parts 6 spaced apart at 12. Secured to the inner faces of bars 6 just forward of wheel 13 are blocks or plates 20, which preferably extend upwardly and forwardly. When in use the axle or bearing of the disks rest on the upper edges of bars 6 between the block 10 and plates 20, see Figs. 1, 2 and 3.

21 designates a hook, formed of the vertical portion 22 having a slot 23 through which the handle portion 7 of the bars 6 pass, the hook having a slidable relation with or on said handle portion 7 between the bolts 15 and 16, as shown in Fig. 3. It is to be noted that said slot 23 is slightly longer than the width of the handle portion 7 so that the hook member may have a slight pivotal swinging action relative to said handle in addition to its slidable relation, so that it may be readily swung and turned so as to frictionally engage the handle portion to hold it in position, as indicated in dotted lines in Fig. 3. The upper end of the hook 21 is suitably bent, as at 24, which is intended to hook over the frame part A of harrow, see Fig. 2.

The trucks are preferably used in pairs. To load a disk on the trucks, the blocks 10 are thrown forward, as shown in dotted lines in Fig. 3; the handles 7 thereof are then preferably inserted between the third and fourth disks from the center of the disk-harrow, one on each side, until the axle or bearings abut with the forward edge of plates 12, when the blocks 10 will be thrown back into the position shown in full lines, in Fig. 3, locating the axle or bearings of the disks between the blocks 10 and plates 12. The handles 7 are raised and the hooks 21 connected with the frame of the disk-harrow, which will raise the disks off of the ground, see Fig. 2. By sliding hooks 21 on frame of truck, the truck can be made to fit any make of disk-harrow. To unload the harrow, drop the hooks 21, throw the blocks 10 forward and drive away.

A transport truck has been used where the wheel of the truck has been run under the disk-axle, but this arrangement requires a small wheel, which runs hard. I obviate this by providing a truck with which it is possible to use a large wheel, approximately fourteen inches in diameter, which runs much easier.

What I claim is:

1. A transport truck, comprising a frame, a wheel journaled at one end of said frame, a hook adjustably mounted on the opposite end of said frame, forwardly extending blocks secured to said frame, and a block pivoted to said frame in advance of said first mentioned blocks and spaced therefrom.

2. A transport truck, consisting of a frame having a handle portion at its forward end, which is normally lower than its opposite end, to adapt the frame to be inserted between the disks of a harrow and below the disk-axle, a wheel connected with the rear end of the frame, plates on the frame, with which the disk-axle will abut, a block having a pivotal relation with the frame located in front of and spaced from said plates and adapted to lock the axle of a harrow between said block and plates, and a hook to connect the frame with the frame of a harrow.

3. A transport truck, comprising a frame, said frame being composed of a pair of bars having their forward ends bent and united to form a handle portion, said bars diverging slightly at an intermediate point so as to provide a narrow space therebetween, a block pivotally secured to said bars and positioned in said space, said block being adapted to be thrown forwardly to permit the truck to be run in under an agricultural implement, said bars diverging to a greater extent near the rear portions to provide a wider space therebetween, a wheel journaled to said bars and positioned in the wider space, blocks secured to said bars to the rear of said pivoted block, said blocks being adapted to serve as stops to hold the axle or bearings of the agricultural implement, said pivoted block being adapted to be swung on its pivot rearwardly so as to bear against the front of the axle of the agricultural implement to hold it against said second mentioned blocks, and a hook member adjustably mounted on said handle portion of said frame adapted to engage the frame part of the agricultural implement.

4. A transport truck, comprising a frame, a wheel journaled at one end of the frame, means to engage and support a disk axle on said frame, a hook member slidably and swingably mounted on the other end portion of said frame and adapted to engage the frame of the harrow.

5. A transport truck comprising a frame, a wheel journaled at one end of said frame, means to engage and support a disk axle, a hook member having a slot or aperture therethrough of greater length than the width of said frame, said hook member being slidably and swingably mounted on the other end portion of said frame and adapted to engage the frame of the harrow.

In testimony whereof I affix my signature, in presence of two witnesses.

SAMUEL B. HAZARD.

Witnesses:
CHAS. W. LA PORTE,
J. W. NAYLOR.